United States Patent [19]
Schoofs

[11] Patent Number: 4,841,564
[45] Date of Patent: Jun. 20, 1989

[54] DC-SUPPLY ARRANGEMENT FOR A TELECOMMUNICATION LINE

[75] Inventor: Franciscus A. C. M. Schoofs, Eindhoven, Netherlands

[73] Assignee: U.S. Philips Corporation, New York, N.Y.

[21] Appl. No.: 63,341

[22] Filed: Jun. 17, 1987

[30] Foreign Application Priority Data

Jul. 8, 1986 [NL] Netherlands ............ 8601774

[51] Int. Cl.⁴ .................................. H04M 19/00
[52] U.S. Cl. ............................ 379/413; 323/224
[58] Field of Search ........... 379/324, 413, 399, 387, 379/412, 405, 345, 338, 348, 346, 398, 400; 323/224, 266, 351, 223; 363/20, 21, 90, 92

[56] References Cited

U.S. PATENT DOCUMENTS

| | | | |
|---|---|---|---|
| 3,531,712 | 9/1970 | Cecchini | 323/224 |
| 4,168,477 | 9/1979 | Burchall | 323/223 |
| 4,373,117 | 2/1983 | Pierce | 379/413 X |
| 4,459,537 | 7/1984 | McWhorter | 323/224 |
| 4,546,421 | 10/1984 | Bello et al. | 363/21 |

FOREIGN PATENT DOCUMENTS

| | | | |
|---|---|---|---|
| 0087669 | 5/1985 | Japan | 379/413 |
| 0228767 | 10/1986 | Japan | 379/413 |
| 1159124 | 5/1985 | U.S.S.R. | 323/351 |

Primary Examiner—Jin F. Ng
Assistant Examiner—Randall S. Vaas
Attorney, Agent, or Firm—Thomas A. Briody; Algy Tamoshunas; Leroy Eason

[57] ABSTRACT

A switched mode DC power supply circuit for a telecommunication line, including a switched converter for charging an output capacitor from a DC source. The converter is controlled by a periodic control signal having a variable duty cycle so as to maintain a selected direct voltage level across the output capacitor. However, due to common mode currents on the telecommunications line, the capacitor may become charged above the selected voltage level even when the duty cycle of the control signal is reduced to zero. Such excess charge is returned to the DC source, without heat dissipation, by providing a further switched converter for coupling the capacitor to the DC source and which is controlled by a second periodic control voltage which is activated when the duty cycle of the first control voltage has been reduced to zero.

4 Claims, 1 Drawing Sheet

DC-SUPPLY ARRANGEMENT FOR A TELECOMMUNICATION LINE

BACKGROUND OF THE INVENTION

1. Field of the Invention

The invention relates to a DC power supply arrangement for a telecommunication line, the arrangement being connectable for its energy supply to a supply source earthed at one terminal, the arrangement having between its output terminals an output capacitor one connection point of which is directly coupled to a terminal of the supply source, the output voltage of the arrangement being controllable to a value lower than the supply source voltage by supplying a controllable charge to such output capacitor under the control of a periodic control signal and having a specified control range.

2. Description of the Related Art

Such a supply arrangement is known from the published report of the "Conference on Communications Equipment and Systems", Apr. 20–22, 1982, organized by the Electronics Division of the U.K. Institution of Electrical Engineers, entitled: "A Semiconductor SLIC", pp. 44–48, more specifically FIG. 1.

The supply arrangement described in the aforementioned report comprises a Switched Mode Power Supply (SMPS) having an output capacitor connected to a telecommunication line. One side of this output capacitor is connected to the earthed positive terminal of a supply source, the other side of it is connected to the negative terminal of the supply source via a self-inductance and a switching element of the supply arrangement.

Switched Mode Power Supplies have the advantageous phenomenon of being capable of deriving a controllable DC current from a fixed supply voltage, the dissipation in these power supplies being negligibly small. The adjustment of the output voltage of these power supplies takes place by means of a control signal varying the duty cycle and/or the switching frequency of the switching element, as a result of which the charge supplied to the output capacitor is controlled.

As a rule two types of currents can generally occur on a telecommunication line: differential mode and common mode currents. When the telecommunication line is in operation under normal and trouble-free circumstances only differential mode currents will occur in this line; these currents are equally large and of opposite direction in the two wires of the line. However, as a result of external disturbances (lightning inductances, short-circuit or asymmetry of the energy network) common mode currents can also be produced in the telecommunication line. These currents have the same direction in the two line wires. These common mode currents have to be discharged to earth, possibly finding a path through the output capacitor. The output capacitor can consequently be charged or discharged. If the output capacitor is discharged this will be compensated for by, for example, an increased duty cycle of the switching element. If the output capacitor is charged, and if the charging current exceeds the discharging current of the load, the voltage across the output capacitor will rise more and more without compensation for this by variation of the duty cycle of the switching element being possible. The voltage across the output capacitor can even rise so high that it hinders the signal traffic or even makes signal traffic impossible. Under these circumstances the telecommunication line is useless for communication purposes. In addition, too high a voltage on the output capacitor can cause too high a dissipation in a (usually integrated) subscribers circuit which may be inserted between the supply arrangement and the telecommunication line.

It might be possible to reduce the excessive output voltage by inserting in parallel with the output capacitor a controllable dissipating element, for example a transistor. However, in modern telecommunication exchanges, having a high packing density of line connection circuits, dissipating elements are undesired.

It might also be possible to avoid an excessive output voltage caused by the common mode currents by selecting an output capacitor of a high value. However, a drawback of this possibility is the volume of such a component. In addition, a large output capacitor can form a low impedance for signal voltages on the telecommunication line, such a capacitor thus forming an undesired load for this line.

SUMMARY OF THE INVENTION

The invention has for its object to provide a DC supply arrangement whose output voltage at common mode on the connected telecommunication line can be kept at the desired level whilst the energy dissipation in this supply arrangement can be made negligibly small.

For this purpose the supply arrangement in accordance with the invention is characterized in that this supply arrangement further comprises a switched mode DC converter whose output voltage can exceed the input voltage, the input of the switched mode converter being connected to the output of the supply arrangement, and the output of the switched mode converter being connected to the charge supply source, the power supply being switched operative under the control of a second periodic control signal, the second control signal occurring if the first control signal has reached the limit of its control range at which charge is no longer supplied to the output capacitor, causing the switched mode converter to derive charge from the output capacitor and to feed this charge to the supply source.

The aforementioned measures achieve that redundant common mode energy stored in the output capacitor is not converted into heat, but is stored in the supply source.

An embodiment of the invention, comprising only a few components, consists of a supply arrangement comprising a diode and, connected between the poles of the supply source, a series arrangement of a first switching element, a self-inductance and the output capacitor. A switching element is connected to a pole of the supply source and the diode is connected in parallel with the series arrangement of the self-inductance and the output capacitor so that this diode blocks the current produced by the supply source. The switching element is controlled by the first periodic control signal. This supply arrangement in accordance with the invention is characterized in that the switched direct voltage converter comprises a second diode and a second switching element, the second diode being connected in parallel with the first switching element such that this diode blocks the current produced by the supply source, the second switching element being connected in parallel with the first diode and being controlled by the second control signal.

A further embodiment of a supply arrangement in accordance with the invention is characterized in that the switched mode converter comprises a third and a fourth switching element and a third and a fourth diode, the third diode and the third switching element being connected in parallel with the output capacitor. The cathode of this third diode is connected to the positive side of the output capacitor, in that the parallel arrangement of the fourth diode and the fourth switching element is connected in series with the output capacitor, this fourth diode blocking discharge current from the output capacitor.

As a result of providing these two switching elements and diodes a highly flexible supply arrangement is obtained, capable of supplying a direct voltage both from the supply source to the output and vice versa, such direct voltage optionally being higher or lower than the voltage of the supply source in both cases.

BRIEF DESCRIPTION OF THE DRAWINGS

The invention and its advantages are described with reference to the following figures, in which the same elements are indicated by the same reference numerals and where.

DESCRIPTION OF THE PREFERRED EMBODIMENTS

Figure 1:
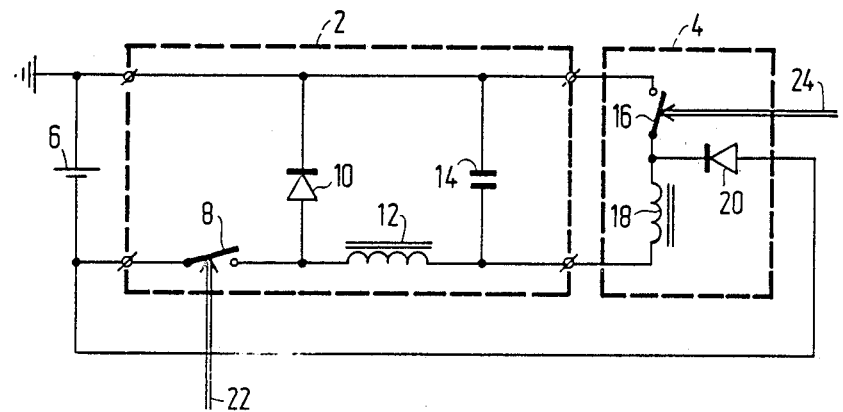
FIG. 1 shows a supply arrangement in accordance with the invention.

FIG. 1 shows a supply arrangement in accordance with the invention comprising a switched direct voltage converter 2 to the input of which a supply source 6 is connected and to the output of which another switched direct voltage converter 4 is connected. Direct voltage converter 2 is suitable for supplying a lower output voltage than the input voltage of supply source 6, and is therefore commonly referred to as a step-down converter. Converter 4 is suitable for supplying an output voltage that may be higher than its input voltage and is therefore commonly referred to as a step-up converter.

Between the input terminals of step-down converter 2 a series arrangment is connected of successively an output capacitor 14, a self-inductance 12 and a switching element 8. Between the positive terminal of supply source 6 and the junction point of switching element 8 and self-inductance 12 a diode 10 is connected, whose cathode is connected to the positive terminal of the supply source 6. The output of step-down converter 2 is across the terminals of the output capacitor 14.

Step-up converter 4 comprises a switching element 16, a self-inductance 18 and a diode 20. The series arrangement of switching element 16 and self-inductance 18 is connected between the output terminals of step-down converter 2, switching element 16 being connected to the positive terminal of the supply source 6. The cathode of diode 20 is connected to the junction of switching element 16 and self-inductance 18, the anode of diode 20 being connected to the negative terminal of supply source 6. The positive terminal of supply source 6 is earthed.

Under normal operating conditions, that is to say in absence of common-mode currents, switching element 8 is controlled by a periodic control signal 22. The frequency of this control signal is for example 200 kHz. During a cycle of this control signal switching element 8 is rendered conductive for some time, after which it is rendered non-conductive again. When switching element 8 has assumed the conductive state there runs a current from the earthed positive terminal of the supply source 6 via output capacitor 14, self-inductance 12, and switching element 8 back to the negative terminal of supply source 6. When switching element 8 has assumed the non-conductive state there is a current running through the closed circuit formed by output capacitor 14 self-inductance 12 and diode 10. The overall charge supplied to capacitor 14 during this cycle equals the overall charge discharged through the load, that is the telecommunication line. The output voltage of capacitor 14 is controlled by the duty cycle of switch 8.

When common mode currents occur it is assumed that these currents run from the supply source 6 earth point in the direction of the telecommunication line not shown in the figure. These common mode currents can run from the aforesaid earth point directly to a first wire of the telecommunication line, or from the aforesaid earth point via output capacitor 14 to a second wire of the telecommunication line. The latter current will charge capacitor 14. With a sufficient magnitude of the common mode current this charge can exceed the charge discharged through the load, making the output voltage of capacitor 14 increase. The control circuit producing control signal 22, will react to this by reducing the duty cycle of control signal 22 and eventually, switching element 8 will continually be rendered non-conductive. Thus no charge will then be applied to capacitor 14 via switching element 8 indeed, yet the charge supply to capacitor 14 by the common mode current is not avoided. The excessive output voltage of capacitor 14 can thus not be decreased by the duty cycle of the control signal 22.

Once the abovedescribed situation occurs, that is to say once control signal 22 reaches the limit of its control range at which switching element 8 is continually rendered non-conductive, step-up converter 4 is activated. A control signal 24 is applied to switching element 16 causing it to open and close alternately. If switching element 16 is closed, capacitor 14 can discharge through this switching element and self-inductance 18. If, subsequently, switching element 16 is opened self-inductance 18 will try to maintain this current. This will cause a current to flow in a current path formed by a self-inductance 18, capacitor 14, supply source 6 and diode 20 back to self-inductance 18. The effect will be that the excess charge of capacitor 14 is fed back to supply source 6 by step-up converter 4, as a result of which no heat owing to dissipation is developed in the supply arrangment in accordance with FIG. 1.

Figure 2:
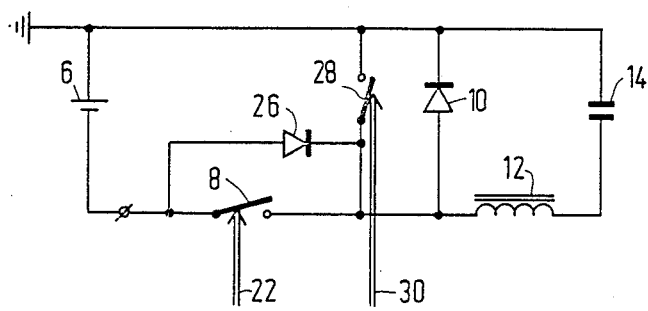
FIG. 2 shows a further supply arrangement in accordance with the invention, with a minimum number of components.

The supply arrangement in accordance with FIG. 2 is simplified variant of the arrangement in accordance with FIG. 1. Between the terminals of supply source 6, whose positive terminal is earthed, there is a series arrangement of successively an output capacitor 14, a self-inductance 12 and a switching element 8. Between the positive terminal of supply source 6 and the junction point of switching element 8 and self-inductance 12 a diode 10 is inserted whose cathode is connected to the positive terminal of supply source 6. A diode 26 is connected in parallel with switching element 8, the diode anode being connected to the negative terminal of supply source 6. A switching element 28 is connected in parallel with diode 10. The switching elements 8 and 28 are controlled by the respective control signals 22 and 30.

Under normal operating conditions switching element 28 is driven into the non-conductive state, switching element 8 being driven by a periodic control signal. Consequently, the desired output voltage is established on output capacitor 14. With common mode currents occurring, so causing an undesired rising of the output voltage of capacitor 14, switching element 8 is continually driven open, and switching element 28 is provided with a periodic control signal 30. When swithing element 28 is closed output capacitor 14 can discharge through self-inductance 12 and switching element 28. When switching element 28 is opened, this discharge current can flow from to output capacitor 14 through a current path formed by supply source 6, diode 26 and self-inductance 12. Thus the excess charge of capacitor 14 is stored in supply source 6, so that in the circuit according to FIG. 2 no heat owing to dissipation is developed.

Figure 3:
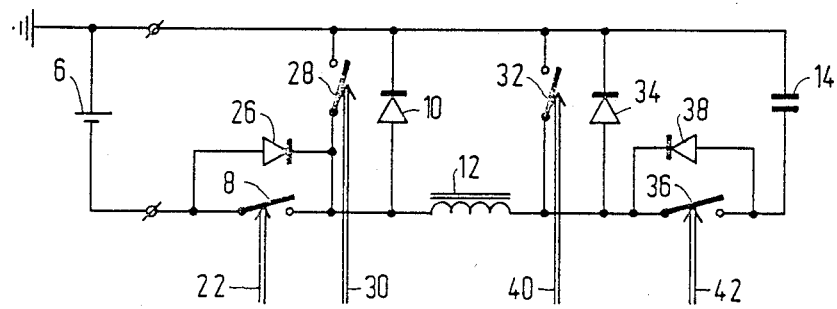
FIG. 3 shows a variant of the supply arrangement in accordance with the invention, suitable for supplying current in two directions both to a higher and to a lower voltage.

The supply arrangement as shown in FIG. 3 can be considered to have been developed from FIG. 2 by adding to the latter figure two switching elements 32 and 36 and two diodes 34 and 38. Diode 38 and switching element 36 together form a parallel circuit; this parallel circuit being connected in series between output capacitor 14 and self-inductance 12, such that the cathode of diode 38 is connected to self-inductance 12. Diode 34 and switching element 32 likewise form a parallel circuit; this parallel circuit being connected between the positive pole of supply source 6 and the junction point of self-inductance 12 and diode 38, such that the cathode of diode 34 is connected to the positive pole of supply source 6. The thus formed supply arrangement can produce on its output terminals a voltage which can be both higher and lower than that of the supply source 6. This supply arrangement is further capable of supplying a voltage from the output capacitor 14 to the supply source 6, not only when the voltage of capacitor 14 is higher but also when it is lower than that of supply source 6.

Under normal operating conditions, and at a desired output voltage lower than that of supply source 6, switches 28 and 32 are constantly open. The conducting state of switching element 36 is not relevant under these conditions, and switching element 8 is driven by a control signal 22. The output voltage across capacitor 14 is now achieved in the same way as described with reference to FIGS. 1 and 2.

It should be noted that the switching position of a switch connected in parallel with a conducting diode is basically irrelevant. It is possible to control such a switch into the closed position if the diode is conducting. This is advantageous in that there will be no dissipation in the diode; but a more complex drive is then required.

Under normal operating conditions, but at a desired output voltage higher than the voltage coming from supply soure 6, switching element 8 is continuously closed, the switching elements 36 and 28 are continuously open; and switching element 32 is driven by a periodic control signal 40. When switching element 32 is in the conductive state a current path is formed from the positive pole of supply source 6 via switching circuit 32, self-inductance 12 and the conducting switch 8 back to the negative terminal of supply source 6. When the switching element 32 is in the non-conductive state, current will continue to flow in the closed circuit due to self-inductance 12, which closed circuit is formed by output capacitor 14, diode 38, self-inductance 12, switch 8 and supply source 6 back to output capacitor 14. Dependent on the current built up in self-inductance 12 during the closing of the switching element 32 the output voltage on capacitor 14 can now assume the desired higher value.

Under common mode conditions the voltage across output capacitor 14 can be higher than the desired output voltage, but still lower than that of the supply source 6. Under these operating conditions the switching elements 8 and 32 are continuously open, switching element 36 is continuously closed and the switching element 28 is driven by a periodic control signal 30. When switch 28 is closed, capacitor 14 can discharge via this switch 28, self-inductance 12 and closed switch 36. When switch 28 is opened, current will continue to flow in the closed circuit formed by self-inductance 12, switch 36, capacitor 14, supply source 6, diode 26 back to self-inductance 12. Thus the excess charge of capacitor 14 is fed back to supply source 6, causing no heat owing to dissipation to develop.

Under common mode conditions it may also occur that the voltage on output capacitor 14 does not only exceed the desired output voltage but also exceeds the voltage of supply source 6. Under these operating conditions the switching elements 28 and 32 are opened continuously and switching element 36 is driven by a periodic control signal 42; the switching position of switching element 8 being irrelevant under these operating conditions. When switching element 36 is closed, capacitor 14 can discharge via a current path formed by supply source 6, switching element 8 or diode 26, self-inductance 12 and via switching element 36 back to capacitor 14. When switching element 36 is open current will continue to flow due to self-inductance 12, through the circuit formed by self-inductance 12, diode 34, supply source 6, and switching element 8 or diode 26, back to self-inductance 12. Thus the excess charge of capacitor 14 is fed back to supply source 6 without dissipation.

In the table given below the switch positions are shown of switching elements 8, 28, 32 and 36 under several operating conditions.

| | | | | |
|---|---|---|---|---|
| step-down from source 6 to capacitor 14 | S | O | O | X |
| step-up from source 6 to capacitor 14 | 1 | O | S | O |
| step-down from capacitor 14 to source 6 | X | O | O | S |
| step-up from capacitor 14 to source 6 | O | S | O | 1 |

O = switch open
1 = switch closed
S = periodic switching
X = switching condition irrelevant

What is claimed is:
1. An improved switched-mode DC power supply circuit for a telecommunications line on which common mode currents may occur, such circuit being connectable to a DC source having a pair of terminals one of which is earthed and the other of which is a DC supply voltage terminal, such circuit having a pair of output terminals between which an output capacitor is con- nected, a terminal of said capacitor being directly connected to said earthed terminal of said DC source, said capacitor being charged from said supply voltage terminal by a first switched DC converter comprising a first switching element which is periodically switched by a first periodic control signal having a variable duty cycle so as to maintain the voltage across the output terminals of said circuit at a preselected level, said capacitor also being charged by said common mode currents;

such improvements being characterized in that said power supply circuit further comprises a second switched DC converter having a second switching element and inductor connected in series across said capacitor, said second converter further having a diode connecting the junction of said second switching element and said inductor to said supply voltage terminal, said second switching element being periodically switched by a second periodic control signal which becomes operative when the duty cycle of said first periodic control signal has been reduced substantially to zero;

said second converter transferring charge from said capacitor to said DC source so as to maintain the voltage across the output terminals of said circuit at said preselected level despite charging of said capacitor by said common mode currents.

2. An improved switched-mode DC power supply circuit as claimed in claim 1, wherein said second switching element is connected between the junction of said diode and said inductor and the earthed terminal of said DC source.

3. An improved switched-mode DC power supply circuit as claimed in claim 2, further comprising a third switching element connected between the earthed terminal of said DC source and a terminal of said inductor, said third switching element being periodically switched by a third periodic control signal so as to supply current from said inductor to said capacitor which charges it to a preselected voltage which exceeds said DC supply voltage.

4. An improved switched-mode DC power supply circuit as claimed in claim 3, further comprising a fourth switching element connected in series between said capacitor and said terminal of said inductor, said fourth switching element being periodically switched by a fourth periodic control signal when the voltage across said capacitor is increased by said common mode currents so that it exceeds said preselected output voltage, said fourth switching element returning the excess charge on said capacitor through said inductor to said DC source.

* * * * *